No. 873,016. PATENTED DEC. 10, 1907.
J. BURNHAM.
PNEUMATIC AND SOLID TIRE FOR VEHICLE WHEELS.
APPLICATION FILED JAN. 28, 1907.

4 SHEETS—SHEET 1.

Witnesses

Inventor,
J. Burnham,
by
his Attorneys

No. 873,016. PATENTED DEC. 10, 1907.
J. BURNHAM.
PNEUMATIC AND SOLID TIRE FOR VEHICLE WHEELS.
APPLICATION FILED JAN. 28, 1907.

4 SHEETS—SHEET 2.

Witnesses
W. May Duval
Myron Clear

Inventor,
James Burnham,
by Wilkinson & Fisher,
his attorneys.

No. 873,016. PATENTED DEC. 10, 1907.
J. BURNHAM.
PNEUMATIC AND SOLID TIRE FOR VEHICLE WHEELS.
APPLICATION FILED JAN. 28, 1907.

4 SHEETS—SHEET 3.

Witnesses
W. May Duvall
Myron H. Clear

Inventor,
James Burnham,
by Wilkinson & Fisher,
his attorneys.

No. 873,016.  
PATENTED DEC. 10, 1907.  
J. BURNHAM.  
PNEUMATIC AND SOLID TIRE FOR VEHICLE WHEELS.  
APPLICATION FILED JAN. 28, 1907.  
4 SHEETS—SHEET 4.

Inventor:  
James Burnham,  
by Wilkinson & Fisher,  
his Attorneys.

Witnesses  
W. May Duvall  
Myron F. Clear

UNITED STATES PATENT OFFICE.

JAMES BURNHAM, OF LONDON, ENGLAND.

PNEUMATIC AND SOLID TIRE FOR VEHICLE-WHEELS.

No. 873,018.

Specification of Letters Patent.

Patented Dec. 10, 1907.

Application filed January 28, 1907. Serial No. 354,583.

*To all whom it may concern:*

Be it known that I, JAMES BURNHAM, a subject of the King of Great Britain, residing at London, England, have invented certain new and useful Improvements in Pneumatic and Solid Tires for Vehicle-Wheels; and I do hereby declare the following to be a full, clear, and exact description of the invention, such as will enable others skilled in the art to which it appertains to make and use the same.

My invention relates to an improved manner of attaching and detaching a pneumatic or solid tire to a vehicle wheel to facilitate the removal of both the tire from the wheel and the inner air tube from the cover: the manner of attaching and removing the tire is equally applicable to solid tires.

To enable my invention to be fully understood, I will proceed to fully describe the same with aid of the accompanying drawings.

Figure 1:
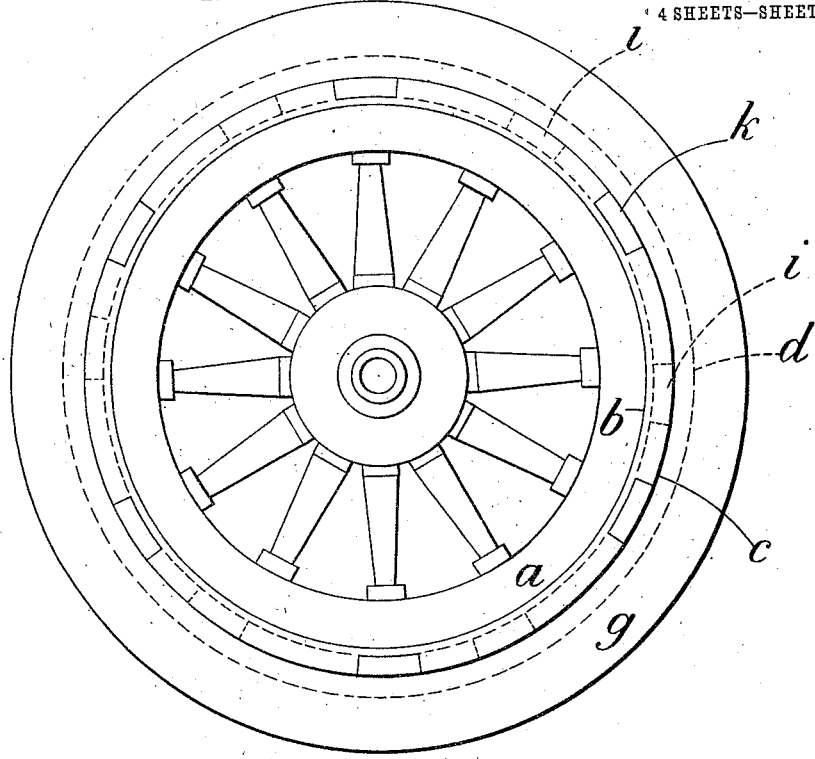
Figure 2:
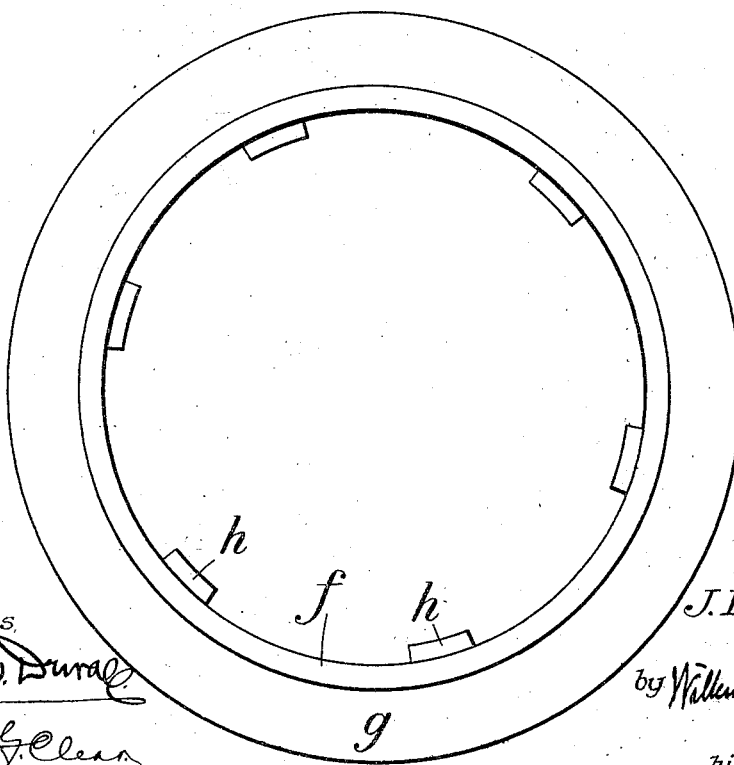
Figure 3:
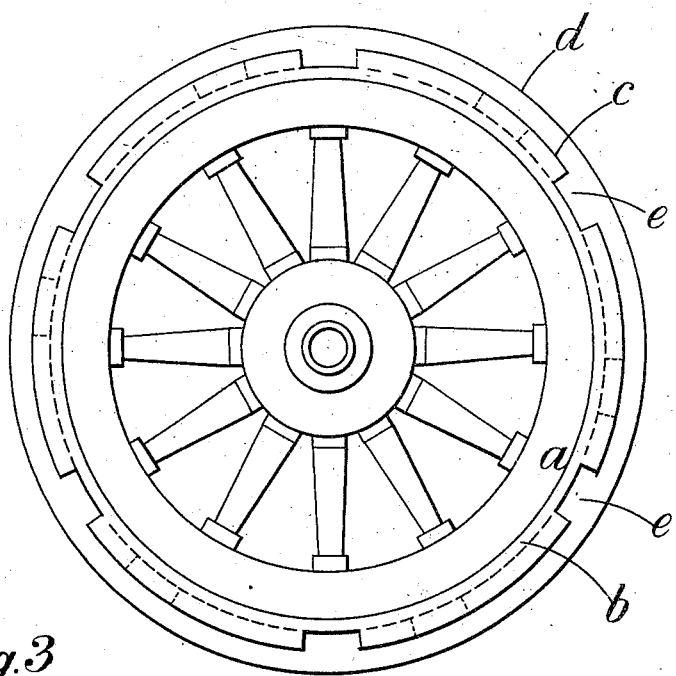
Figure 4:
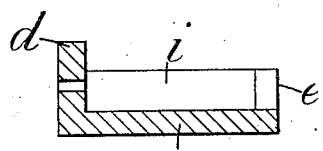
Figure 5:
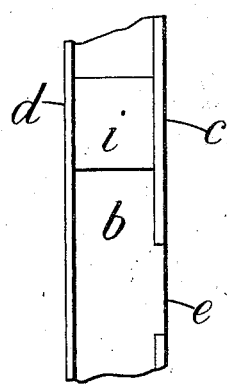
Figure 6:
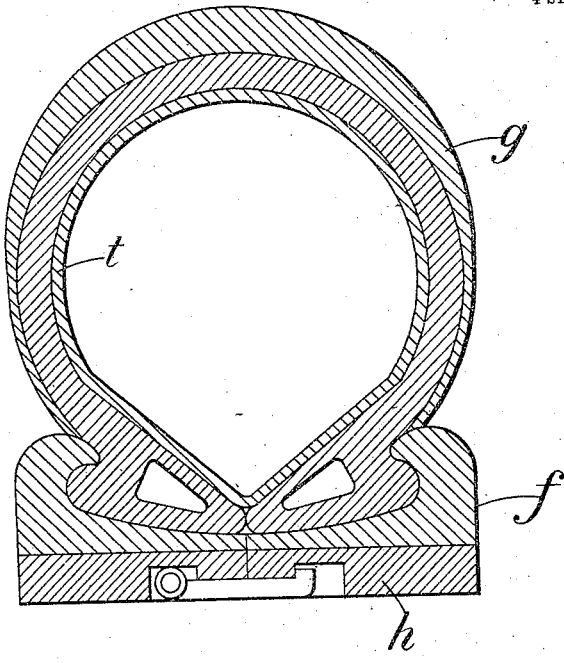
Figure 7:
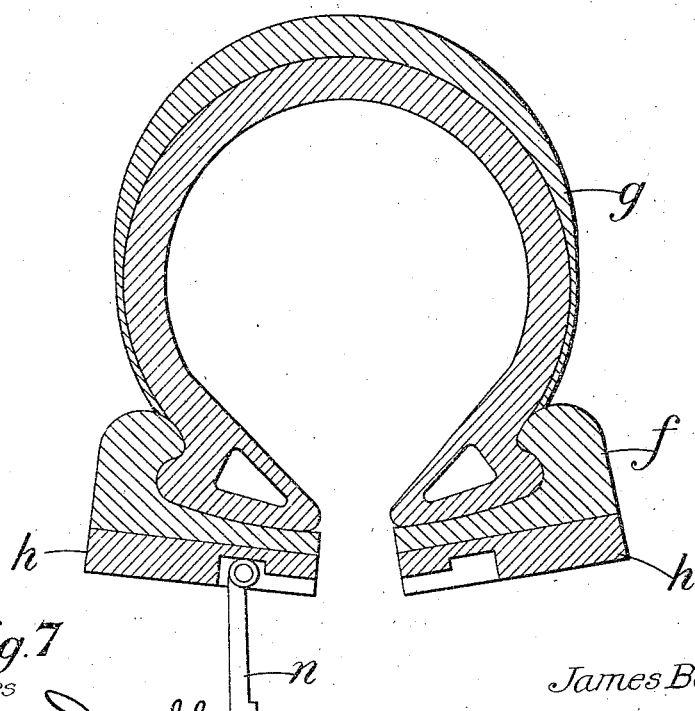
Figure 8:
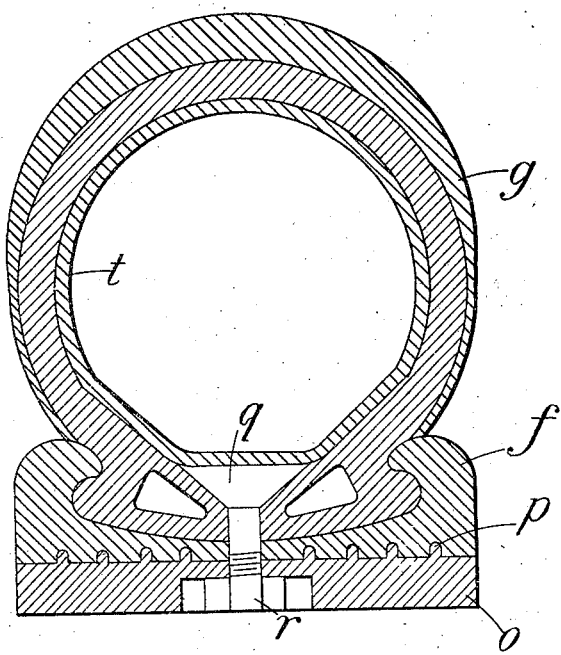
Figure 9:
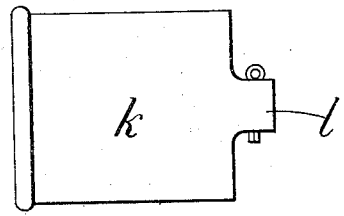

Figure 1, illustrates a side view of a wheel complete according to this invention. Fig. 2, a side view of tire rim and tire detached from wheel. Fig. 3, a side view of wheel with tire rim detached and fitted with a securing tire. Fig. 4 a cross section of the securing tire drawn on a larger scale. Fig. 5 a front view of a segment of securing tire. Fig. 6 a cross section of tire rim and tire drawn to a larger scale showing a preferred locking arrangement for the divided rim. Fig. 7 a similar view of preceding figure unlocked with air tube removed. Fig. 8 a similar view to Fig. 6 showing a modified form of locking device. Fig. 9 a detached view of a securing cross wedge.

In carrying the invention into practice I take a suitable wheel such as is shown at Fig. 3 and secure upon the periphery of the felly $a$ a strong metal band $b$ with thrown up side flanges $c$, $d$, the flange $d$ being higher than the flange $c$; these flanges form a circular path to secure the tire rim $f$. In the flange $c$ at equal distances apart, I form notches $e$. I provide a tire rim $f$ of special construction as hereafter explained, to carry the outer tire $g$. Upon the inside of this tire rim $f$ I form or secure blocks $h$ of a size to pass into the notches $e$ when the tire rim is put on the wheel. One side of tire rim and blocks coming against the inside of flange $d$, the tire rim $f$ being then turned a short distance round for the blocks $h$ to lock between the flanges $c$, $d$. It will be understood that the diameter of the tire rim $f$ is slightly larger than the diameter of flange $c$ so that the tire rim can pass over it. Fitted between the flanges $c$, $d$, are bearing blocks $i$ (see Fig. 4) the top coming flush with the top of flange $c$. Upon the top of these bearing blocks the inside of tire rim $f$ bears. Upon the tire rim being put on the wheel and turned a short distance as described, one end of each of the blocks $h$ will come against one of the bearing blocks $i$ when a wedge $k$ is passed into the notches $e$ so preventing the tire rim $f$ turning back, and thus locking the tire rim to the wheel. To secure the wedge it is formed with a tag end $l$ which projects through the flange $d$ and is retained by a split cotter.

To remove the tire rim with tire $g$, it is only necessary to draw out the wedges $k$ and turn the rim sufficiently back for the blocks $h$ to come opposite the notches $e$ when the tire rim can be laterally pulled off the wheel over the top of flange $c$.

To enable the inner tube to be easily got at and removed, I form the tire rim $f$ of two parts which are preferred to be locked together when the rim is to be put on the wheel with the air tube inflated. If the locks are not used then the air tube can only be inflated after the tire rim is locked on the wheel.

Figs. 6 and 7 illustrate suitable locking means at $n$. These locks are countersunk on the outside of blocks $h$. The form of lock and block shown at Fig. 8, consists of a plate $o$ with projecting pegs $p$ which take into corresponding holes in the inside of tire rim $f$ and is secured by a security bolt $q$ passing from inside of cover $g$ through the plate $o$ and held by countersunk nut $r$ on the stem. These plates $o$ can be made to form the blocks $h$.

Having now described my invention, what I desire to secure by Letters Patent of the United States is.—

1. The combination of a wheel, a band on the exterior thereof having side flanges of unequal heights, one of said flanges being notched and the other slotted, of a tire rim carrying a tire and provided with internal projections of substantially the same size as said notches, and wedges fitting in said notches, substantially as described.

2. The combination of a wheel, a band on the exterior thereof, having side flanges of unequal heights, one of said flanges being slotted and the other notched, said band being also provided with stop pieces, a tire rim carrying a tire, said rim being of a size to pass over the narrower of said flanges and having inwardly-projecting blocks of substantially the same size as said notches, and wedges adapted to fit into said notches, one end of each wedge passing into one of said slots, substantially as described.

3. The combination of a tire, a two-part tire rim holding said tire, the inner edges of said rim abutting squarely against each other, two-part fastening blocks secured to said tire rim at intervals, and countersunk means for locking the parts of said blocks together, thereby locking the parts of said tire rim together and leaving the interior of said blocks with a smooth surface when locked, substantially as described.

In testimony whereof, I affix my signature, in presence of two witnesses.

JAMES BURNHAM.

Witnesses:
 FREDERIC PRINCE,
 H. D. JAMESON.